United States Patent [19]

Wright

[11] Patent Number: 4,908,109
[45] Date of Patent: Mar. 13, 1990

[54] ELECTROLYTIC PURIFICATION SYSTEM UTILIZING RAPID REVERSE CURRENT PLATING ELECTRODES

[75] Inventor: Francis C. Wright, Yardville, N.J.

[73] Assignee: Mercer International, Inc., Mendham, N.J.

[21] Appl. No.: 171,684

[22] Filed: Mar. 22, 1988

Related U.S. Application Data

[63] Continuation-in-part of Ser. No. 790,847, Oct. 24, 1985, Pat. No. 4,732,661.

[51] Int. Cl.[4] .............................................. C02F 1/46
[52] U.S. Cl. ..................................... 204/149; 204/275
[58] Field of Search ................................ 204/149, 275

[56] References Cited

U.S. PATENT DOCUMENTS

| | | | |
|---|---|---|---|
| 3,783,114 | 1/1974 | Ishi et al. | 204/149 |
| 3,944,478 | 3/1976 | Kuji et al. | 204/275 |
| 4,179,347 | 12/1979 | Krause et al. | 204/149 |
| 4,194,972 | 3/1980 | Weintraub et al. | 204/149 |
| 4,381,232 | 4/1983 | Brown | 204/182.4 |
| 4,461,693 | 7/1984 | Jain | 204/301 |
| 4,578,160 | 3/1986 | Asano et al. | 204/98 |
| 4,585,539 | 4/1986 | Edson | 204/228 |
| 4,612,104 | 9/1986 | Holmes et al. | 204/272 |
| 4,632,737 | 12/1986 | Mindler | 204/98 |
| 4,732,661 | 3/1988 | Wright | 204/275 |

*Primary Examiner*—T. M. Tufariello
*Attorney, Agent, or Firm*—Alan M. Sack, Hoffman & Baron

[57] ABSTRACT

An electrolytic flotation system for purifying waste water includes plurality of planar electrodes in a flotation tank. The electrodes are arranged to distribute the production of microbubbles uniformly throughout a large region of a flotation zone resulting in a uniform non-turbulent flow path between the inlet and outlet of the tank. Consequently, highly efficient removal of impurities is obtained with a relatively low detention time. The electrolytic flotation system also includes a tapered float concentration zone for separating the float from the waste water and a sump region for separating settled sludge from the waste water.

The electrolytic flotation system utilizes rapid current reversal at low amp density. The rapid current reversal in the electrolytic flotation system allows the use of stainless steel electrodes without the need for noble metal coatings. Using this technique, the polarity of the current is reversed approximately every six to twelve seconds, preventing the destruction of the anodes due to the dissolution of metal oxide into the waste water. Rather, when the current is reversed, the oxide is converted back into the unoxidized metal and thus is not lost in the waste water.

22 Claims, 4 Drawing Sheets

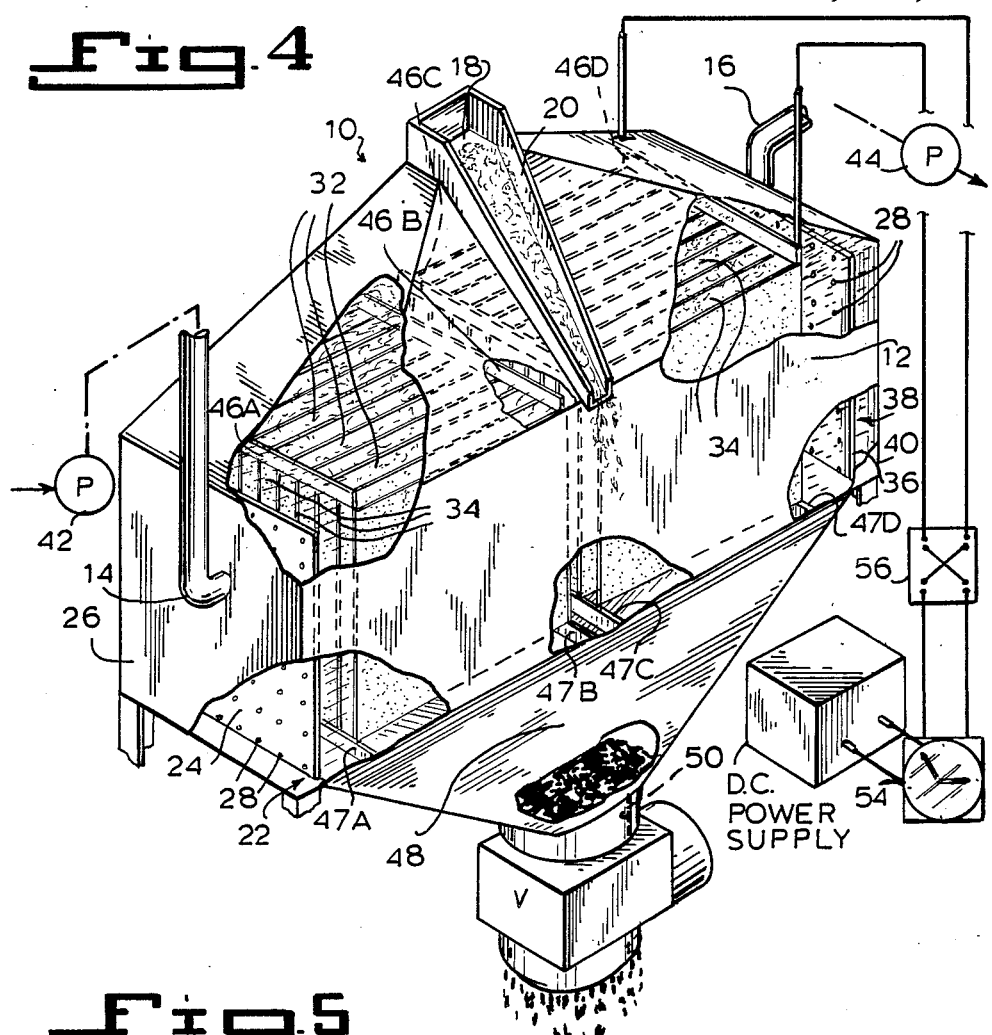
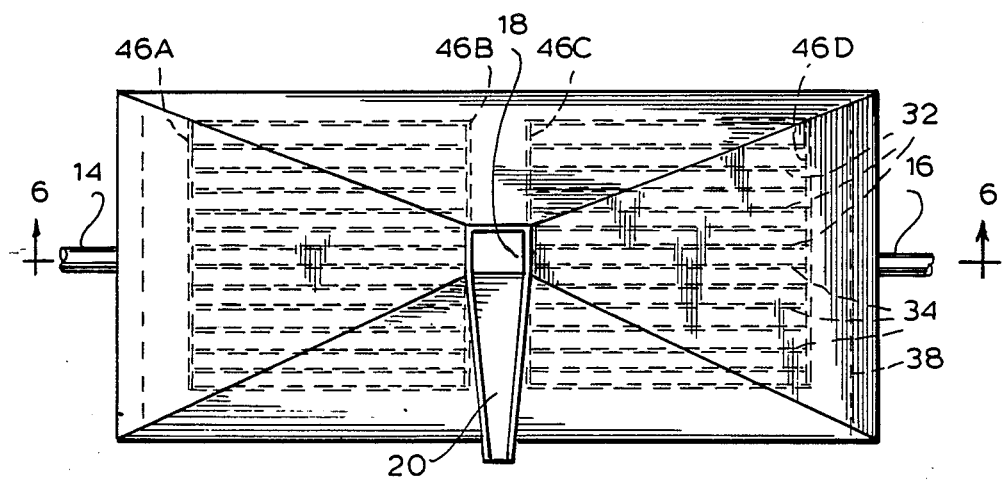

ELECTROLYTIC PURIFICATION SYSTEM UTILIZING RAPID REVERSE CURRENT PLATING ELECTRODES

This is a Continuation-In-Part of pending U.S. patent application Ser. No. 790,847, issued to Francis C. Wright on Mar. 22, 1988 as U.S. Pat. No. 4,732,661.

BACKGROUND OF THE INVENTION

1. Field of the Invention

This invention relates to electrolytic flotation systems for purifying waste water.

2. Background of the Related Art

The control of water pollution is an important objective of modern society. Millions of tons of waste water are produced daily in every city in the world. Industrial waste water has been of particular concern since it often contains metallic and oily residues which are both environmentally hazardous and difficult to remove.

One method of purifying waste water is by the introduction of very small bubbles ("microbubbles") into the waste water stream. The microbubbles adhere to particulates and other impurities, such as oils, in the waste water and lift them to the surface. The impurities can be removed by skimming a layer of froth from the surface of the water. There are many varieties of flotation systems, but most fall into one of two categories: the pressurized-air flotation systems and the electrolytic flotation systems.

In the pressurized-air flotation systems, air is introduced under pressure, causing it to dissolve in the waste water. The pressure is then relieved, and the air comes out of solution in the form of microbubbles. In other versions of the pressurized-air flotation systems, the air is introduced into the waste water at atmospheric pressure by a device which insures that the bubbles formed in the waste water are small. The small bubble size is important because small bubbles have more of a tendency to adhere to impurities. They are also more efficient, tending to float a greater mass of waste for a given mass of air.

By contrast to the pressurized-air flotation systems, the electrolytic flotation systems are considerably simpler in construction. They simply include several electrodes disposed in a tank through which the waste water flows. A potential difference is imposed between the electrodes, and the resulting current through the waste water causes electrolysis of the water to generate hydrogen and oxygen bubbles. The bubbles adhere to the impurities, causing flotation in a similar manner to that described in regard to pressurized-air flotation systems.

The electrolytic flotation systems are considerably simpler in design and thus require less of an initial investment. The electrolytic flotation systems do not require the compressors, high-pressure pumps, and pressuremonitoring devices that are required for pressurized-air flotation systems. The pressurized-air flotation systems, however, have been considerably more popular, because the electrolytic systems traditionally have required a high amount of energy resulting in high operating costs per unit mass of impurities removed from the waste water.

A typical electrolytic flotation system includes a treatment tank in which the waste water resides while the microbubbles attach themselves to impurities and carry them to the surface. The size of the flotation tank is determined by the capacity of the system—i.e., the number of gallons per minute of waste water that is treated by the system—and by the detention time, which is the average time required for the waste water to flow from the inlet to the outlet of the tank. The required volume of the tank is equal to its capacity multiplied by its detention time. For example, a flotation system that processes one gallon of waste water per minute and requires a detention time of one hour must have a volume of 60 gallons.

The capital cost of the system generally increases with its volume, so it would be desirable for the detention time to be as low as possible. A certain amount of detention time is required, however, in order to allow the microbubbles to mix into the waste water and diffuse through the fluid in the tank, adhere to the waste impurities and float to the surface. Practitioners in the art of electrolytic flotation believed that it is desirable to maintain a highly turbulent fluid flow, so that the bubbles and impurities would thereby quickly mix within the tank. For example, U.S. Pat. Nos. 3,944,478, 3,783,114 and 4,179,347, which are described in more detail below, utilize high speed, high power electrolysis, introducing the waste water to the electrodes in a turbulent flow. These systems are inefficient, in that they consume relatively large amounts of electrical power to produce a large volume of gas per unit of impurities removed or volume of water processed.

The specific design parameters encountered in discussing the efficiency of electrolytic flotation systems are: the ratio of gas produced to solids removed; and, the ratio of energy consumed to the volume of water processed. The former parameter has ranged in prior systems, such as the ones listed above, from 0.3 to 0.06 or more kilograms of gas used per kilogram of solids removed, the ratio depending on the type of waste water and the intended level of purity. The gas-to-impurities ratio largely determines the energy required to float a given quantity of impurities, because, for a given electrode voltage, the power consumed is proportional to the rate of gas production.

Another problem inherent in electrolytic flotation systems, is the breakdown of the anodes due to oxidation, as well as, the build-up of scale, scum and dissolved minerals on the surface of the electrodes. Anodic breakdown, and scale and scum formation lead to loss of efficiency and a destruction of the electrodes, requiring replacement of the electrodes at frequent intervals. These additional problems translate into even higher operating costs.

Some electrolytic flotation systems take advantage of the anodic breakdown to introduce metallic ions into the waste water flow. Typical examples of these systems are disclosed in U.S. Pat. Nos. 4,194,172 and 3,944,678. Specifically, U.S. Pat. No. 4,199,972 to Weintraub et al., discloses breaking an oil-in-water emulsion by anodically dissolving ferrous ions into the emulsion. Likewise, U.S. Pat. No. 3,944,478 to Kuji et al., discloses an electrolytic drainage treating apparatus which includes a high speed, high power electrolyzer which includes a tank with a series of electrodes that are closely disposed perpendicular to the flow the waste water, an arrangement typical of prior electrolytic flotations systems.

The system described in the U.S. Pat. No. 3,944,478 uses an extremely high current and voltage source connected to the electrodes, freeing metallic ions from the anode, which eventually is consumed. The free ions attach to the particles of foreign matter in the waste water and the floc is then floated by the bubbles to the surface, where it is removed by a skimmer. This patent stresses the use of high speed, high power electrolysis in which a very fast and turbulent flow is required in order to clean the plates, and requires the use of a current density of over 1,000 amps per square meter (Col. 1, lines 44-52). Operation of this system, therefore, results in high energy costs per amount of waste removed, typically need in excess of 0.3 kg's of gas per kg of solids removed. In addition, the anodes must be replaced at regular intervals. In all such systems, the user is thus required to suffer the consequences of high operating costs for supplying energy to the electrodes and for replacement of the electrodes due to anodic breakdown.

Other electrolytic flotation systems take advantage of relatively inert materials such as lead and noble metals, such as platinum, for coating the anodes to prevent anodic destruction. However, the cost of noble metal coated electrodes significantly increases the initial cost of the flotation system. In addition, noble metal coated electrodes, as well as lead electrodes are still subject to scale and scum build up resulting in loss of efficiency and destruction of the coatings. Furthermore, the use of lead electrodes in waste water which may later be utilized for human consumption may lead to lead poisoning.

An electrolytic waste water treatment system which utilizes noble metal coating of the electrodes is disclosed in U.S. Pat. No. 4,179,347 to Krause et al., which provides an apparatus for chlorination and aeration of waste water using electrolytic flotation to separate solids from the water. This patent requires plates coated with precious metals in order to produce high speed, high powered electrolysis, and prevent rapid breakdown of the anodes. In addition, this patent requires the addition of an electrolyte such as sodium chloride to ensure high conductivity in the waste water for the high speed, high powered electrolysis to liberate chlorine gas in order to disinfect the waste water. The high speed liberation of bubbles in the waste water causes the agglomeration of the bubbles and reduces the efficiency of the device. In addition, the arrangement of baffles in the tank induce more turbulence and an upward streaming of the waste water around the bottom surface of the baffles. This arrangement increases the agglomeration and mixing of the bubbles, and thus, further reduces the efficiency of the electrolytic flotation system.

The use of precious metal coated electrodes in the system described in U.S. Pat. No. 4,179,347 does not solve the problem of scale and sludge build-up on the plates. Thus, this reference requires cleaning, scraping and skimming of the electrodes to remove the floated solids, and scale and scum adhering to the plates. The scraping of the plates, not only adds to the initial cost of the system for the additional scraping equipment, and to the operating cost of the system for the energy required to run the scrapers, but also wears down the precious metal coatings of the plates. The increased initial cost of this system due to the precious metal coated electrodes and the scraping and skimming apparatus, as well as the high operating costs due to inefficient high speed, high powered electrolysis, all have been contributing factors against the use of such electrolytic flotation systems.

The scrapers required in the electrolytic flotation system of U.S. Pat. No. 4,179,347 are typical of previous electrolytic and pressurized or dissolved air flotation systems. These designs use complex mechanical scrapers which pull the floated wastes from the top surface of the waste water, and in the case of electrolytic flotation systems, scrape floated wastes from the top surface of the electrodes, out of the tank onto a ramp. These scrapers are mechanically complex and require additional energy to remove the floated impurities. In addition, these methods not only remove floated impurities, but also introduce a high percentage of water which requires additional energy to remove by evaporation, incineration or landfill processes.

The technique of reversing the polarity of the electrodes at infrequent intervals has been utilized to remove scale and sludge build-up on noble metal coated electrodes. For example, U.S. Pat. No. 4,612,104 to Holmes et al., discloses an electrochemical cell for producing sodium hypochloride from a sodium chloride solution. The electrochemical cell is not directed towards electrolytic flotation, but rather, the sodium hypochloride is used for chlorination and disinfection of water. The cell utilizes annular platinum coated titanium electrodes, in a closed housing defining an annular flow passage in which a sodium chloride solution is introduced. Current reversal at infrequent intervals, approximately every 15 minutes, is used to remove calcium deposits from the platinum coated electrodes without damaging the platinum coating. At Col. 3, lines 9-12, this patent discloses that rapid current reversal for removing the calcium deposits would be detrimental, since it would damage the platinumcoated electrodes.

Other electrolytic flotation systems ignore anodic loss, and are more concerned with voltage build-up due to scale and slime formed on the electrodes. Such a system is disclosed in U.S. Pat. No. 3,783,114 to Ishii et al., in which relatively large iron anodes are suspended vertically, perpendicular to the flow of waste water; and, horizontally disposed cathodes are arranged close to the bottom of the tank. This arrangement prevents scum, arising from the electrolysis of the metal ions, fats and oils, from coating the cathodes. This system, however, requires a high current density and results in destruction of the anodes. For Column 3, lines 26 and 59-65. Accordingly, this systems requires the user to incur the cost of frequently replacing the anodes, as well as, high operating costs due to inefficient, high power electrolysis.

In the field of electrodialysis, which uses electrical potential differences for the separation and concentration of ions, scale and sludge formation present problems to the user. In electrodialysis systems, the electrical potential difference is not used for bubble formation to remove wastes by flotation, but rather the potential difference causes the migration of particles through a dialysis membrane. Scale and sludge build-up on the anode and dialysis membrane require frequent cleaning and replacement of these components. To solve this problem, U.S. Pat. Nos. 4,381,232; 4,578,160; 4,585,539; and 4,461,693 periodically reverse of the polarity of the electrodes to descale the anode and the dialysis membrane. Typical of these is U.S. Pat. No. 4,578,160 to Asano et al., describing a method for electrodialysis of dilute caustic alkali aqueous solutions. This patent discloses an electrodialysis cell divided by a cation exchange membrane with electrodes made from iron, nickel or their base alloys. In the cell, the current flows in the positive direction for as long as possible, usually about 15 minutes for approximately 97% to 60% of the total electrodialysis cycle. The current is then reversed for as short a duration as possible, typically 3% to 30% of the total electrodialysis cycle. Reversal causes sludge and scale to drop off the anode and cation exchange membrane (See Col. 5, lines 1-9, 10-19 and Col. 6, lines 8-13). This apparatus does not utilize electrolytic flotation and discloses at Col. 5, lines 1-9 that it is disadvantageous to rapidly reverse the direction of the current, over very short intervals of time. Due to the high current density, and the appreciable difference between the duration of current in the positive direction, as opposed to the duration of the current in the negative direction, this apparatus, as well as each apparatus disclosed in the other electrodialysis patents listed above, does not address, nor prevent anodic destruction.

Other, non analogous systems utilize infrequent intervals of current reversal in electrolytic solutions to deplete various electrolytes from the anode or cathode. For example, U.S. Pat. No. 4,632,737 to Mindler, discloses an apparatus for electrolytic reduction of nitrate from solutions of alkali metal hydroxides which are contaminated by oxidizing transition metal ions. The method utilizes the addition of bismuth to the solution at high current densities. The 15 ampere current is reversed at intervals ranging from about every two minutes to every 30 minutes in order to allow bismuth to be depleted from the cathode and bismuth petroxide to be depleted from the anode. This process results in anodic destruction due to high current densities and infrequent intervals of current reversal.

Accordingly, it is the object of the present invention to provide an electrolytic flotation system which efficiently removes contaminants from a waste water stream and has low electrical power requirements as compared to other electrolytic flotation systems.

It is another object of the present invention to provide an electrolytic flotation system which protects stainless steel electrodes from the effects of anodic destruction without requiring expensive precious metal coated electrodes.

A further object of the present invention is to provide electrolytic flotation system which protects the electrodes from scale and scum build-up and the attendant costs of maintenance and increased power consumption.

Still another object of the present invention is to provide a flotation system which efficiently removes floated wastes from the surface of the water without the use of scrapers or skimmers.

SUMMARY OF THE INVENTION

The foregoing and related objects are achieved by the electrolytic flotation system for purifying waste water of the present invention, which includes a plurality of planar electrodes in a flotation tank. The electrodes are arranged to distribute the production of microbubbles uniformally throughout a large region of a flotation zone, resulting in a uniform non-turbulent flow path between the inlet and outlet of the tank. Consequently, highly efficient removal of impurities is obtained with a relatively low detention time.

The electrolytic flotation system utilizes rapid current reversal at low amp density. The rapid current reversal in the electrolytic flotation system allows the use of stainless steel electrodes without the need for noble metal coatings. Using the technique, the polarity of the current is reversed approximately every 6–12 seconds, preventing destruction of the anodes due to the dissolution of metal oxide into the waste water. Rather, when the current is reversed, the oxide is converted back into the unoxidized metal and, thus, is not lost in the waste water.

Another aspect of this invention is a means for separating floated wastes from the waste water utilizing a tapered float concentration zone of deceasing crosssectional area at the top of the tank. The tapered float concentration zone concentrates the gas bubbles and floated wastes above the surface of the waste water. The tapered float concentration zone terminates at an outlet above the surface of the water so that, the floated wastes are ejected from the outlet by the force generated from the flotation pressure of the concentrated gas bubbles rising through the tapered float concentration zone. Thus, the tapered float concentration zone separates the floated wastes from the water, resulting in an output which contains a low concentration of water.

This invention is based on the concept that turbulent flow through an electrolytic flotation system is undesirable, since it results in agglomeration of microbubbles into much larger bubbles which cannot efficiently remove impurities by flotation. This is in contrast to other devices disclosing the use of a turbulent flow which mixes with a dense stream of highly concentrated bubbles. In these devices a high concentration of bubbles is produced in a small tank volume, causing coalescence of the bubbles. The bubbles are produced immediately in front of the flotation zone with the bubble-waste water mixture then entering the flotation area. A turbulent flow of waste water disperses the concentrated bubbles in a flotation tank having a large volume. In the large flotation tank, the flow of waste water decreases in turbulence, allowing the bubbles to adhere to suspended wastes, thus causing flotation.

In the present invention it is preferred that the flow of waste water is made substantially non-turbulent before production of microbubbles. Microbubbles are thus produced over a large volume and over a wide surface area of the electrolytic cell, avoiding coalescence, thus, requiring a much lower current density and ratio of gas-per unit of impurities floated. The design of the present invention allows the use of increased flow velocities without the introduction of turbulence, thus resulting in decreased detention times.

By employing the teachings of this invention, it is possible to reduce the current density of the cell by as much as an order of magnitude or more. In addition, the ratio of gas produced to impurities removed is likewise decreased by an order of magnitude or more in comparison to other electrolytic flotation systems. Furthermore, due to the increased efficiency of the electrolytic flotation system of the present invention, the corresponding power consumption of the system is decreased by an order of magnitude or more in comparison to prior electrolytic flotation systems, see Table 6.

The preferred utilization of a low current density in the electrolytic flotation device of this invention provides another unexpected benefit, the preservation of untreated stainless steel or iron based electrodes from the effects of anodic breakdown, scale and scum formation inherent in electrolytic waste water treatment apparatus. Low current density in the electrolytic cells allows the rapid reverse current plating (rapid "RCP") technique, described herein, to protect the electrodes from anodic breakdown, scale and scum formation without the need for costly and somewhat ineffective noble metal coated electrodes.

BRIEF DESCRIPTION OF THE DRAWINGS

These and other features and advantages of the present invention are described in connection with the accompanying drawings, in which:

FIG. 4 is a perspective view of another preferred embodiment of the electrolytic flotation system according to the present invention with a portion of the tank housing broken away to show the interior mechanism;

FIG. 5 is a top plan view of the electrolytic flotation system illustrated in FIG. 3;

DETAILED DESCRIPTION OF THE PREFERRED EMBODIMENTS

Figure 1:
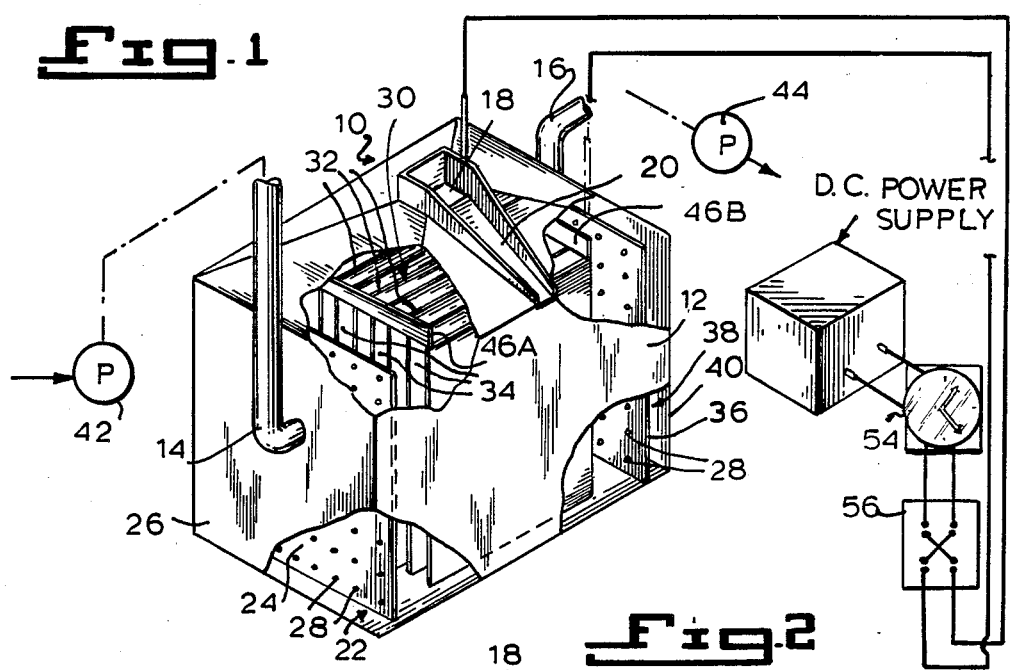
FIG. 1 is a perspective view of one preferred embodiment of the electrolytic flotation system in accordance with this invention with a portion of the tank housing broken away to expose the internal mechanism.

The preferred electrolytic flotation systems 10 of the present invention, illustrated in FIGS. 1-6, include a flotation tank 10 for the intake of waste water, a first outlet 16 for the emission of purified waste water and a second outlet 18 for the emission of floated wastes at the top of the flotation tank 12 through an inclined drain 20.

Inside tank 12, between the inlet 14 and first outlet 16, two distribution baffles 24, 36 preferably include perforations 28 in each of the distribution baffles 24 and 36, respectively. The perforated distribution baffles 24, 36 extend vertically across the tank 12 and parallel to each other in order to create a flow distribution region 22 between the first end of the tank 26 and the first perforated distribution baffle 24, for providing a substantially non-turbulent flow of waste water in a flow path between and perpendicular to the perforated distribution baffles 24, 36. A collection zone 38 is created between second perforated flow distribution baffle 36 and a second end 40 of the tank 12.

Accordingly, the flow of waste water proceeds from inlet 14 into the flow distribution region 22 and through the perforations 28 of the first perforated distribution baffle 24. The flow then enters a flotation zone 30 and then flows through the flotation zone 30 to the second perforated distribution baffle 36. The water then flows through perforations 28 into collection zone 30 and out of the electrolytic flotation apparatus through first outlet 16. In flotation zone 30, the flow of waste water has a cross-section which is parallel to both the first and second perforated distribution baffles 24, 36 so that the waste water flows as a uniform, substantially non-turbulent plug from the first perforated distribution baffle 24 to the second perforated distribution baffle 36. Although perforated distribution baffles 24, 36 are described herein, other means for distributing the flow of waste water in a manner that results in the waste water being distributed to flow through the flotation zone uniformally, as a substantially non-turbulent plug are contemplated to fall within the scope of this invention.

In order to provide for flotation of suspended impurities in the waste water, a plurality of planar electrodes, including alternating anodes 32 and cathodes 466, extend vertically in the tank 12 perpendicular to the perforated distribution baffles 24, 36. During operation of an electrolytic flotation device 10, the electrodes are fully immersed in the waste water and aligned parallel to the flow path of the waste water.

Figure 2:
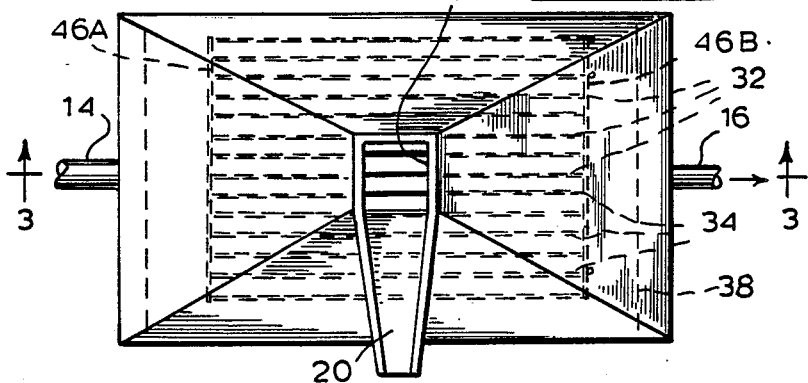
FIG. 2 is a top plan view of the electrolytic flotation system illustrated in FIG. 1, with the plates shown in phantom lines.
Figure 3:
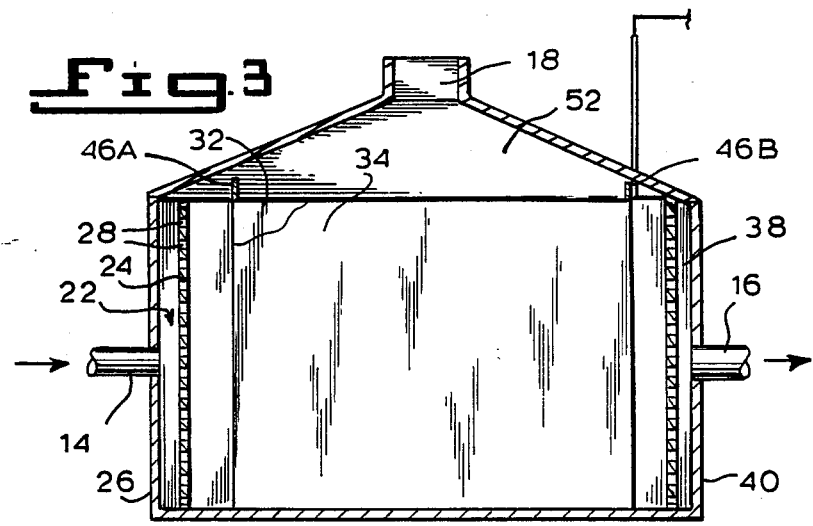
FIG. 3 is an elevational cross-sectional view taken at line 3—3 of FIG. 2, shown in the direction of the arrows.
Figure 6:
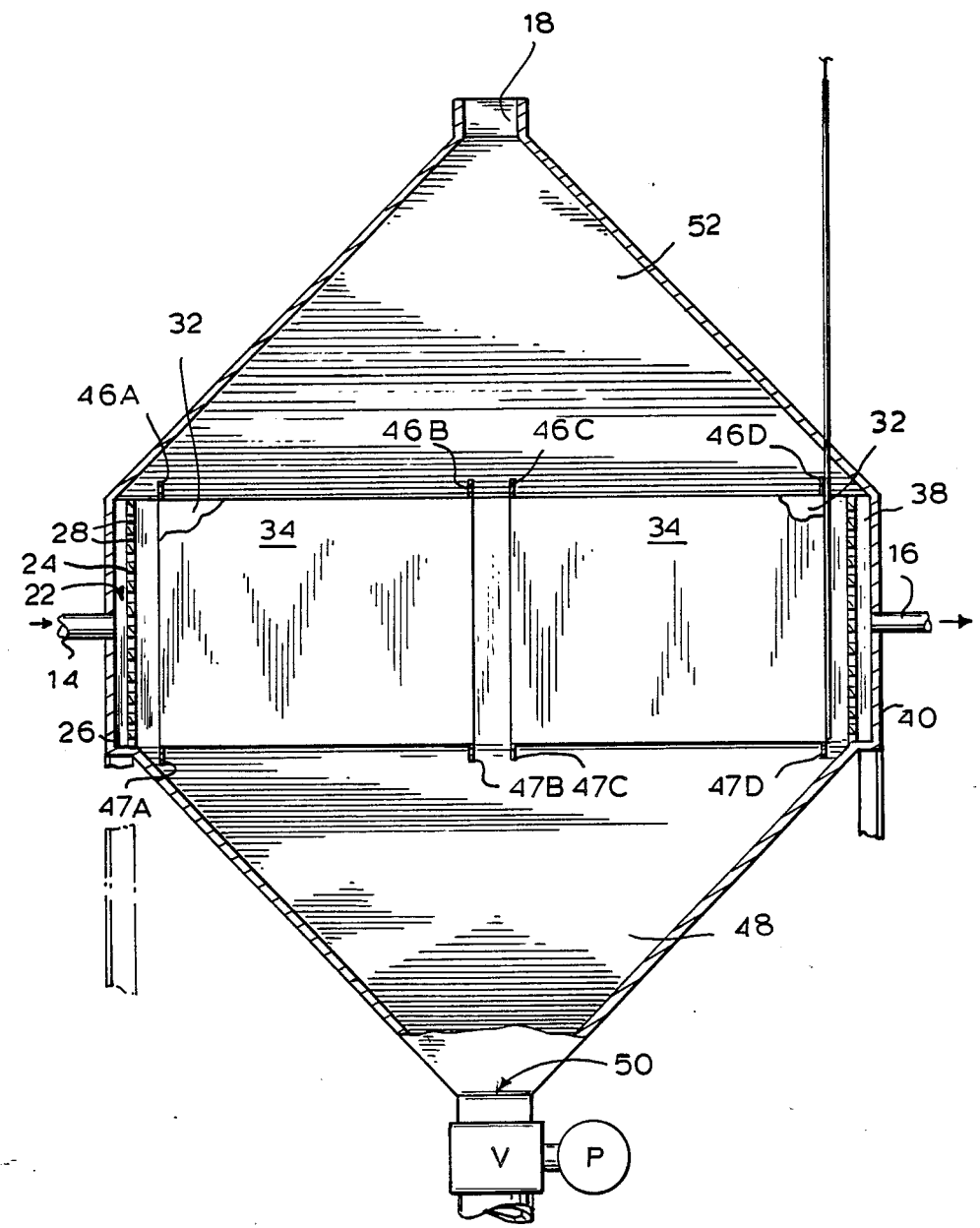
FIG. 6 is an elevational cross-sectional view taken at line 5—5 of FIG. 5, shown in the direction of the arrows; and, FIG. 7 is a photograph of the electrolytic cell of Example 11 shown on the left, and the electrolytic cell of Example 12 shown on the right for visually comparing the effects of this invention in preventing anodic breakdown.

In some electrolytic flotation units of this invention, only 1 set of electrodes is required, as is illustrated in FIGS. 1-3, however, in other electrolytic flotation units of this invention, more than 1 set of electrodes are preferred, as illustrated in FIGS. 4-6. Each cell of electrodes is wired in parallel, and contains alternating anodes 32 and cathodes 34. If more than one set of electrodes are used, as illustrated in FIGS. 4-6, each set is connected to the other in series. The set of electrodes, preferably should span substantially the entire horizontal cross-section of the flow path of waste water through flotation zone 30. This preferred arrangement prevents the flow of waste water from forming a fluid "short circuit" by flowing around the set of electrodes.

It is also preferred to include additional baffle plates 46A and 46B, are above either end of the first set of electrodes, to prevent the waste water from forming a fluid "short circuit" by flowing above the electrolytic cell. Thus, the baffles 46A and 46B are positioned perpendicular to the flow of waste water and are preferably attached to the side of the upper portion of the electrolytic flotation tank 12, but not extending entirely to the top of the tank 12 so as to allow the flow of floated waste above and around these baffles 46A and 46B. If more than one set of electrodes is included, as illustrated in FIGS. 4-6, then an additional set of baffles 46C and 46D should be added to prevent a fluid "short circuit" above the additional set of electrodes. Thus, it is preferred to include two baffles for every set of electrodes. In some electrolytic flotation apparatus 10, such as those illustrated in FIGS. 4-6, which include a sump region 48 below the electrodes, an additional set of baffles 47A and 47B below the first set of electrodes prevents a fluid "short circuit" of waste water flowing below that set of electrodes. Preferably, additional sets of lower baffles 47C and 47D should be added in electrolytic flotation devices having more than one set of electrodes. Baffles 47 are attached to the walls of sump region 48, allowing enough clearance for settled impurities to pass below the baffles 47 and flow towards the sump outlet 50. Baffles 46 and 47 prevent a fluid "short-circuit" by requiring more energy to be expended by the waste water to flow around baffles 46 and 47 than the energy required to flow between the electrodes.

The combination of perforated baffles 24 and 36, situated across substantially the entire cross-section of the flow path of the waste water, results in a substantially non-turbulent plug flow whose cross-section is a vertical plane perpendicular to electrodes 32,34. Added to this structure are the vertically arranged planar sets of electrodes and the horizontal baffles 46 and 47 further directing the flow of waste water between the adjacent pairs of electrodes, splitting the flow into narrow vertical non-turbulent streams and allowing the rate of flow to be increased, reaching a relatively high velocity while maintaining a substantially non-turbulent flow. The waste water is pumped through the tank 12 by either an inlet pump 42 and/or an outlet pump 44 designed to maintain a predetermined flow rate calculated to allow the flow to be substantially non-turbulent. The inlet pump 42 and/or outlet pump 44 may optionally be controlled in response to water level within the flotation zone 30 or in response to a turbulence metering device monitoring the flotation zone 30, or in response to some other parameter of interest.

Sump region 48, is preferably included beneath flotation zone 30 to collect heavy impurities that settle to the bottom of the tank 12 instead of floating to the surface. A controlled outlet 50 including an adjustable flow device and an electric pump which regulates the outflow of settled sludge and other impurities is preferably included to remove the sludge and settled impurities from the sump region 48 without allowing waste water to escape from tank 12. Preferably, the sump region 48 is sloped downwardly, at an angle of about 45° towards controlled outlet 50, which preferably has a circular cross-section, to allow the sludge and settled impurities to be forced towards controlled outlet 50 by the force of gravity.

A DC power supply is connected to the electrodes 32, 34 through timer 54 and relay 56, described in more detail below. Thus, at any one time anodes 32 are alternately interdispersed between cathodes 34 and energized with a potential difference from power source 52 to produce a current flowing between adjacent electrodes 32, 34 causing electrolysis in the waste water flowing between electrodes 32, 34, thus generating bubbles of hydrogen and oxygen gas between the respective electrodes. Electrodes 32, 34 are disposed relatively close to each other, preferably at an inter-electrode distance of less than 10.0 cm in order to keep the maximum path-to-electrode distance below approximately 5.0 cm. It is especially preferred that the inter-electrode distance is less than 1 cm, thus, in Examples 1–6 and 11–12 described below, the maximum path-to-electrode distance is 0.18 inch (0.47 cm), or a 0.36 inch (0.94 cm) inter-electrode spacing.

The microbubbles produced by the electrolysis adhere to impurities suspended in the waste water and cause the impurities to float to the surface of the waste water above the electrodes 32, 34. The relatively small inter-electrode spacing results in the microbubbles not having to travel far before reaching the suspended impurities in order to adhere to the surface of the impurities and cause flotation. Thus, if the inter-electrode spacing is 1 cm, a microbubble needs to travel a maximum horizontal distance of only 0.5 cm before reaching suspended impurities. As a result of the close inter-electrode spacing, the average time between production of a microbubble and its adherence to an impurity in the waste water is relatively short. This arrangement allows the detention time of waste water within the flotation zone to be relatively short, so that the velocity of the waste water flowing through the flotation zone may be increased without lowering the percentage of impurities removed from the waste water.

The floated impurities coated with microbubbles slowly rise to the surface of the waste water. The level of the waste water is preferably maintained at a level of a few inches to a few feet above the surface of the electrodes and baffles 46 to allow floated waste to freely float above the electrodes and baffles 46 with minimal adherence to these structures. The region of tank 12 above the electrodes is designated as the float concentration zone 52. The level of the waste water in the float concentration zone 52 is preferably about 2–3 inches below second outlet 18. Float concentration zone 52 has an cross-sectional area which terminates at a second outlet 18 on the top of the float concentration zone 52. The tapering of the cross-sectional area of float concentration zone 52 concentrates the floated wastes and microbubbles to increase the upward force produced by the gas rising through the increasingly tapering cross-sectional area. The concentrated gas forces the impurities from the surface of the waste water out through second outlet 18 as froth and floated impurities which flow down inclined chute 20 into a collection tank (not shown). The tapered float concentration zone 52 of the present invention separates the floated impurities from the water in the tank 12 due to the ever increasing pressure of the gas rising through the tapered float concentration zone 52, forcing the concentrated impurities out through second outlet 18. The flotation device of the present invention results in a concentrated float output which is relatively low in water, further adding to the efficiency of the present invention. The top of the flotation device of the present invention, including float concentration zone 52, preferably is attached to the body of the tank 12 as a hinged cover which is sealed around its periphery during use (not shown). Various hinges, sealing and locking means may be used and adapted to be used with this invention by those skilled in the art, all of which are intended to fall within the scope of this invention.

After the flow of waste water passes through the electrodes it reaches the second perforated baffle 36, at that point the waste water is substantially free of suspended impurities. The purified waste water passes through the perforations 28 in the second perforated baffle 36 into collection zone 38 and is then emitted from tank 12 through the first outlet 16. In electrolytic flotation systems utilizing more than one set of electrodes, the subsequent sets of electrodes are connected in series one after another to the prior set of electrodes. The first set of electrodes is preferably positioned approximately 6 inches to 1 foot from the first baffle plate 24 to allow any currents in the waste water flow to settle prior to the flow reaching the first set of electrodes. If a second set of electrodes is included, a space of approximately 6 inches to 1 foot is preferred between the first and second set of electrodes. This space allows any impurities which are floated by gas produced by the first set of electrodes to rise above the surface of the electrodes before the flow contacts the second set of electrodes. Likewise, a distance of 6 inches to 1 foot is preferred between the end of the last set of electrodes and the second perforated baffle 36 to achieve an even flow distribution between the first and second distribution baffles 24, 36 and to allow the remaining floated impurities to rise above the last set of electrodes before the purified waste water contacts the second baffle 36.

This arrangement of electrodes and baffles allows the velocity of waste water flowing through the flotation zone 30 to be relatively high without producing turbulence and the consequent agglomeration of microbubbles into larger bubbles which are less efficient than microbubbles in producing flotation of impurities.

The electrodes of the present invention can operate at a current density below approximately 100 amperes per square meter, although a current density of below 200 amperes per square meter may be used for certain applications. A current density of 10–20 amps/sq. meter (1–2 amps/sq. ft) is preferred for most waste water purification systems in which stainless steel electrodes are utilized. From an operational standpoint, there is no lower limit on the current density except for the minimum current density which is required to produce electrolysis in the particular waste water being processed. It is believed, however, that current densities below 2 amperes per square meter (0.2 amperes per square foot) would result in prohibitively large electrodes and a failure to produce a significant amount of micro-bubbles per unit area. As discussed above, it is preferred that the electrodes are separated by distance less than 5 cm, however, the closer the electrodes, the lower the current density which can be utilized, and accordingly the higher the efficiency of the corresponding electrolytic flotation system. Thus, a separation of less than 1 cm is most preferred.

Another important feature of this invention is that the electrodes have a large surface area. In order to provide an adequate exposure of the impurities in the waste water to micro-bubbles, it is preferred that the cell area should be at least 5 square meters per liter per second of the waste water flow. The calculation of cell area is illustrated in Example 2. In addition, the electrolytic cell should preferably provide at least two square meters of cell area per cubic meter of flotation zone volume.

Due to the high electrode cell area, as compared to prior systems, the current density can be maintained at an extremely low level while still achieving effective flotation. The combination of high cell area and low inter-electrode separation results in the microbubbles being widely dispersed from the moment they are created. Thus, there is no need for a turbulent waste water flow, as required in some prior systems, for mixing and dispersing concentrated microbubbles into the waste water flow before the flotation zone where the bubbles adhere to the impurities in the waste water.

The novel structure of the electrolytic flotation system 10 of the present invention creates a non-turbulent flow through closely spaced electrodes. The present invention allows the use of a low current density between adjacent electrodes to produce microbubbles that are highly dispersed throughout the flow, and accordingly do not coalesce. This results in extremely efficient removal of suspended impurities from the waste water. As a result, the electrolytic flotation system of this invention requires substantially less power than prior electrolytic flotation devices and is typically more than an order of magnitude more efficient in the removal of floated impurities than the prior electrolytic flotation systems.

The non-turbulent flow of waste water and the use of low current densities enables the electrodes of the electrolytic flotation system 10 of the present invention to be protected from damage due to the effects of anodic breakdown, as well as scale and scum formation by the use of rapid reverse current plating (rapid "RCP"). As previously mentioned, the rapid reversal of the direction of the current flowing to the electrodes changes the polarity of anodes 32, turning them into cathodes 34, and vice versa. The pairs of adjacent electrodes are preferably connected in parallel to a regulated direct current power supply 52. Power supply 52 preferably is designed to produce a constant current output regardless of the load due to variations in the waste water. A suitable DC power supply is manufactured by the Tork Company of Mount Vernon, N.Y. and is designated as Model No. 8061. The DC power supply is connected to a timer unit 54 which may be preset for the duration of current flowing in one direction to the electrodes. The timer unit 54 may also be preset for the duration of the time lapsed between reversal of the direction of the current and the period of time that the current flows through the electrodes in the reverse direction. The timer unit 54 sends a signal to relay switch 56 which in response to timer unit 54 allows current from the regulated DC power source to flow to the electrodes in either the initial or reverse direction, or alternatively turns off the flow of current. At current densities ranging between 10 to 50 amps/sq. meter (1-5 amps/sq. ft) anodic destruction of stainless steel electrodes can be effectively halted by reversing the current flow every 6 to 18 seconds.

Many factors are involved in the determination of the rate of which non-precious metal anodes dissolve into an electrolytic solution, requiring replacement of the anodes. The characteristics of the solution, whether neutral, acidic or alkaline, whether highly conductive or low in concentration of electrolytes, as well as the types of electrolytes used are all factors which may effect the rate of anodic destruction at any given current. For example, a lead or platinum coated anode, releasing current even at a high current density in a highly acidic solution of sulfuric acid, will remain undissolved almost indefinitely. The stability of a lead anode is partly attributed to the formation of a lead sulfate film on the surface of the anode, a film which resists breaking off into the acidic solution.

Many metals, including most stainless steel alloys, will form metal oxides on the surface of the anode. The metal oxide, typically ferrous, nickel or chromium oxide, once formed on the surface of the anode, very quickly breaks off and releases into the electrolytic solution. once the oxide layer breaks off, more oxide is formed which is subsequently lost when it too releases into the electrolytic solution. Thus, the anode slowly decomposes.

It is believed that rapid reversal of the direction of the current for periods from approximately 6-18 seconds, at a current density between about 10-50 amps/sq. meter (1-5 amps/sq. ft) will prevent anodic destruction of most stainless steel electrodes. It is thought that this rapid current reversal causes the metal oxide film to be reduced back to the original metal state during the time the electrode is operating as a cathode, while in the meantime, the anode is forming an oxide layer. However, since the current density is low and the current is reversed within 6 to 18 seconds, the oxide layer formed on the anode does not have a chance to release into the electrolytic solution. Thus, when current reversal causes the anode to be changed to a cathode, the metal oxide film is reduced back to the original metallic state. This continuous cycle of current reversals, designated herein as the reverse RCP technique, leads to a continuously forming oxidized metal film during anodic operation which is returned to the original metallic state by the reverse electro-chemical driving force during cathodic operation of the electrode. Thus, the rapid RCP technique protects both sets of electrodes from the effects of anodic destruction.

The rapid RCP technique also results in the additional benefit of causing the release of any scale and scum adhering to the electrodes. Thus, when electrostatically charged scale or scum adheres to the electrode, current reversal causes a repulsion force which causes the scale and scum to drop off the surface of electrode. The scale and scum then either settles to the sump region 48 or is floated to the surface by the gas generated by the electrodes.

While the preferred embodiments of this invention have been described as utilizing stainless steel plates with a preferred current density of approximately 10–50 amps/sq. meter, and a preferred rapid RCP rate of 6–18 seconds, it is contemplated that under other conditions, the rate of RCP can be increased until a practical limit is reached. This practical limit may be dictated by the timing, switching and relay equipment or by the physics of device--i.e. the shortest duration for the particular current utilized which results in electrolysis of the solution and formation of gas. Thus, in some situations a much higher current density may be utilized with very short rapid current reversals. Likewise, in some electrolytic solutions and/or in utilizing more highly corrosion resistant electrodes, it is contemplated that the rate of current reversal may be increased above the 6–18 second duration, even when higher current densities are being utilized.

Other practical considerations are the rates at which the metal oxides deposit into the solutions when higher current densities or more electrolytically conductive solutions are being utilized. Thus, it is contemplated that with very rapid current reversals, utilizing oxidation resistant electrodes, the rapid RCP technique can even be applied to the prior electrolytic flotation devices which do not incorporate the preferred structure described herein.

The principles described above are illustrated in the foregoing Examples 1–12.

EXAMPLE 1

One version of the electrolytic flotation system of the present invention, included a cell having 22 (plates) electrodes 8.5 inches (22 centimeters) high by 4.33 inches (11 centimeters) long in a tank enclosure 8.5 inches high by 7.76 inches wide, and having a length between the distributor plates of 1.0 foot. Thus, the electrodes extended the full height of the tank, but only about a third of the length of the flotation zone. In such a system, a flow rate of one-half gallon per minute (1.89 liters per minute) was employed, thereby obtaining a flow velocity of 1.75 inches per minute (0.074 centimeters per second). In the presence of the electrodes of the cell, this flow velocity resulted in non-turbulent flow. The water to be purified was car-wash waste water having approximately 200 milligrams of suspended matter per liter of water. The current density was 23 amperes per square meter with 38.5 square meters of cell area per cubic meter of flotation-tank volume and 15.9 square meters of cell area per liter per second of flow. A potential difference of 7.5 volts was applied between the anodes and cathodes, and the system drew a current of 11.5 amperes, thereby using 0.017 kilogram of gas per kilogram of impurities floated. The energy cost to operate this system was calculated using an energy cost of 8 cents per kilowatt-hour, which resulted in an energy cost of 4.5 cents-per 1000 liters of water treated.

Although no attempt was made during that demonstration to minimize the energy consumption of the system, the above rate of power usage was still significantly lower than that of other electrolytic flotation systems, see the results shown in Table 6. Also, the removal of impurities was quite effective despite a detention time of only 8.3 minutes.

EXAMPLE 2

An electrolytic flotation device incorporating the teachings of the present invention was employed on machinery wash water. The wash water contained impurities having about 33 percent by volume, and 3.3 percent by weight, solids or debris and decomposition products of oils and solvents. In this example, the electrolytic flotation device included a cell having 24 electrodes spaced 0.367 inch (0.932 centimeters) apart. Each electrode measured 8.5 inches by 4.3 inches (21.6 centimeters by 10.92 centimeters), resulting in 36.55 square inches (236 square centimeters) of electrode area. With 24 electrodes, there were 23 cell sections, so the total cell area was 23 sections x 36.55 square inches per section, or a total cell area of 5.88 square feet (0.546 square meter). The electrolytic flotation device had a flow rate of 0.45 gallon (1.70 liters) per minute through a 0.5 square-foot (0.0465 square meter) entry area in a tank having a 1-foot (0.305-meter) length, the resultant detention time was 8.33 minutes. A potential difference of 7.5 volts was impressed across the electrolysis cell. This causes a current of 15 amperes to flow in the system. Accordingly, the current density in the electrolysis cell was approximately 27.5 amperes per square meter. There were thus 38.5 square meters of cell area per cubic meter of tank volume and 19.2 square meters of cell area per liter per second of water flow through the flotation tank. The result was a highly satisfactory cleaning of the wash water using three grams of gas per kilogram of impurities removed. Again, no attempt was made to minimize the energy consumption; the purpose of the test was only to demonstrate the effectiveness of the device. Still, its energy consumption and ratio of produced gas to removed impurities was much lower than typical prior-art devices, see Table 6. The energy cost was calculated as in Example 1 to be 6.7 cents-per 1000 liters of water treated.

EXAMPLE 3

A third demonstration employed the same electrolytic flotation device as was used in the second demonstration, and machinery wash water was again used. In this demonstration, the wash water was a condensate from steam cleaning which contained approximately 2 percent oil and black debris. The flow rate was the same as in the second demonstration, but a potential difference of 8.5 volts was impressed across the electrolysis cell, resulting in a current of 9.0 amperes, and a current density of 1.53 amperes per square foot (16.5 amps/sq. meter) of cell area. The electrolytic flotation has a cell area of 38.5 square meters per cubic meter of flotation-tank volume and 17.3 square meters of cell area per liter per second of flow. Again, the ratio of gas produced to impurities removed was 3 grams per kilogram. The energy cost was calculated as in Example 1 to be 4.5 cents-per 1000 liters of water treated.

EXAMPLE 4

The same type of waste water cleaned in the second demonstration was also cleaned in the fourth demonstration. Additionally, the same size flotation tank and same flow rate were employed. The separation between electrodes was maintained at 0.367 inches (0.932 centimeters). The electrode plates were the same size, but a second cell was placed behind the first cell and connected to the first cell in series so that the effective area of the cell was doubled. Using this arrangement, a potential difference of 7.5 volts was impressed across the electrodes, and 15 amperes of current were drawn. This arrangement resulted in a current density of 13.7 amperes per square meter of cell area with 77.0 square meters of cell area per cubic meter of flotation-tank volume and 34.6 square meters of cell area per liter per second of flow through the flotation tank. The result was satisfactory removal of foreign matter with a gas usage of three grams of gas per kilogram of removed impurities. The energy cost was calculated as in Example 1 to be 6.6 cents-per 1000 liters of water treated.

EXAMPLE 5

The fifth demonstration treated waste water that resulted from pressure spraying of industrial machinery with detergent. The waste water had a pH of 10.6 and contained approximately 1.5 grams of suspended matter per liter of waste water. The suspended matter consisted of oily and black particulates and a surfactant. Since the flow rate was only 0.25 gallon per minute (0.0158 liter per second), the ratio of cell area to flow rate was 34.6 square meters per liter per second. The ratio of cell area to flotationzone volume was 38.5 square meters per cubic meter.

When a potential difference of 3.5 volts was impressed across the electrolytic cell, ten amperes were drawn, resulting in a current density of 18.3 amperes per square meter of cell area. With a detention time of 15.0 minutes, satisfactory results were achieved with a gas usage of 0.079 kilograms of gas produced per kilogram of floated impurities. The energy usage in this demonstration was considerably higher than in the first four demonstrations, but it was still considerably lower than that achieved by typical prior designs, see Table 6. Nearly equivalent results could have been obtained, however, with much lower power consumption. The energy cost was calculated as in Example 1 to be 3.7 cents-per 1000 liters of water treated.

EXAMPLE 6

The sixth demonstration also involved machinery wash water, generally oily water having from five to fourteen percent oil and debris. The electrolytic flotation apparatus achieved the same electrode arrangement as in the second demonstration with a flow rate of one-half gallon per minute (0.0316 liters per second). A potential difference of 8.5 volts was applied across the electrodes, and the unit drew a current of 8.5 amperes and a current density of 15.6 amperes per square meter. Satisfactory results were obtained with a gas-to-impurities ratio of only 2.5 grams of gas per kilogram of removed impurities. The ratio of electrode area to flow rate was 34.6 square meters per liter per second. The detention time in this unit was 8.3 minutes. The energy cost was calculated as in Example 1 to be 3.8 cents-per 1000 liters of water treated.

EXAMPLE 7

Three steel alloys were compared in order to determine the relative weight loss due to anodic breakdown of electrodes in an electrolytic device. In these preliminary tests (Examples 7–10) a small cell consisting of an anode and a cathode with a cell area of approximately 12 square inches was placed in a small beaker of water. A potential difference was imposed across the cell allowing a current of 0.15 amps to flow between the electrodes. The solutions in which the cells were immersed were visually observed and analyzed for iron content. Analysis of metal content in the solutions of Examples 7–10 was performed by Accutest, Inc., Dayton, N.J. Table 1 summarizes the results of tests on electrodes made from 301 stainless steel ("301 SS"), 321 stainless steel ("321 SS") and hot-rolled steel.

TABLE 1

| | |
|---|---|
| Rapid RCP? | No |
| Cell Area: | 12 sq. inches, or 0.055 sq. feet |
| Current: | 0.15 Amps |
| Current Density: | 2.7 amps/sq. foot |
| Solution: | Tap Water |

| Anodic Material | Time of Test (Hours) | Anodic Weight Loss (grams) |
|---|---|---|
| 301 SS | 67 | 0.3 |
| 321 SS | 67 | 0.2 |
| Hot Rolled Steel | 10 | 1.7 |

In order to more easily compare the weight loss of metals due to anodic breakdown the results shown in Table 1 were converted to pounds per amp-year (lb/amp-yr). This term allows for easy comparisons in tests where the current densities or other conditions have been varied. The anodic weight loss in lb/amp-yr. for the three steel samples tested have been tabulated in Table 2, below:

TABLE 2

| Anodic Material | Anodic Weight Loss lb/amp-yr. |
|---|---|
| 301 SS | 0.58* |
| 321 SS | 0.39 |
| Hot Rolled Steel | 22.0 |

*The weight loss in lb/amp-yr. for 301SS was calculated as follows:
0.3 grams/453 grams per lb. × 8736 hrs. per yr./67 hrs. of test × 1 amp/0.15 amp of test equals 0.58 lb/amp-yr.

This example demonstrates that the stainless steel samples were much more resistant to weight loss due to anodic breakdown than the hot rolled steel under the same low current density conditions (2.7 amps/sq. foot).

EXAMPLE 8

This example was conducted under similar conditions are Example 7 above, except that the polarity of the current was reversed every 6, 18, 48 and 180 seconds. The test parameters and the results are summarized in Table 3, below:

TABLE 3

| | | | |
|---|---|---|---|
| Anodic Area: | 0.028 sq. ft | | |
| Current: | 0.175 amps | | |
| Current Density: | 6.25 amps/sq. ft | | |
| Electrolytic Solution: | Tap Water buffered with 0.01% Sodium Bicarbonate | | |
| Electrode Material: | Hasteloy B* | | |
| Duration of Test: | 30 minutes | | |

| RCP Interval | Appearance of Solution (after test) | Analysis of Solution (mg metal/liter of Solution) | | |
|---|---|---|---|---|
| | | Fe | Ni | Chr |
| 6 seconds | Clear | 0.03 | 9.95 | .45 |
| 18 seconds | Hazy | .03 | — | — |
| 48 seconds | Opaque | .03 | 22.3 | — |
| 180 seconds | Opaque | — | — | — |

*Haseltoy B is a high nickel stainless steel traditionally known for its high corrosion resistance (subsequent tests, not shown here indicated that this alloy is more susceptible to anodic breakdown than the other alloys of stainless steel tested).

This example illustrated that rapid current reversal for durations between 6 and 18 seconds significantly slowed down the rate of anodic breakdown.

EXAMPLE 9

This example was conducted in order to determine the effects of increased current density on anodic breakdown under the rapid RCP technique. This test was conducted under similar conditions as Examples 7 and 8 except that 316 SS was used. The test conditions and results of this test are summarized in Table 4 below:

TABLE 4

| | | | | |
|---|---|---|---|---|
| Electrode Material | | | 316 SS | |
| Rate of RCP | | | 12 seconds | |
| Current Density (amps/Sq. ft.) | Duration of Test | Appearance of Solution | Amp Min's Consumed | Solution (mg fe/liter) Analysis |
| 2.9 | 1 hour | Light haze | 36 | 1.47 |
| 11.5 | 1 hour | Moderate haze | 24 | 1.15 |
| 17.3 | 1 hour | Very hazy | 36 | 0.195 |
| 86.3 | 12 minutes | Very hazy | 36 | 0.81 |

All electrodes had a cell area of 0.0347 sq. ft, except for the first set of electrodes which were used at a current density of 2.9 amp/sq. ft and had an area of 0.208 sq. ft.

The visual appearance of the solutions after the tests strongly indicated that even with the identical amount of work (amp min's consumed), the increased current density overshadows the protective effect of RCP at 12 second intervals. The analysis of the iron content in the solutions, however, did not correlate with the visual appearance of the solutions. Either there was an error in the analysis of the solutions, or possibly other metals contained in the stainless steel electrodes dissolved more rapidly than iron.

EXAMPLE 10

The example illustrates the protective effect of rapid RCP at low current densities on both iron and stainless steel electrodes. This test was conducted under similar conditions as Examples 7-10. A high silicon cast iron, which has been promoted to have a higher resistance to anodic breakdown than stainless steel, was used as the anode with a 316 stainless steel cathode. Then the 316 stainless steel was used as the anode with the high silicon cast iron used the cathode. Finally, the electrodes were used while reversing the direction of the current every 12 seconds. The conditions of the tests and the results are summarized in Table 5 below:

TABLE 5

| | |
|---|---|
| Electrode Material: | High silicon cast iron, 316 SS |
| Current: | 0.15 Amps |
| Current Density: | 5.4 amp/sq. ft. |
| Potential Difference: | 5.0 volts |
| Duration of Test: | 1 hour |
| RCP Interval: | 12 seconds |
| Solution: | Water buffered at a pH of 5.6 with 0.01% sodium bicarbonate and 0.02% acidic acid |

| Anodic Material | Appearance of the Solution | Analysis of Solution (mg Fe/liter) |
|---|---|---|
| Silicon cast iron | Opaque | 11.4 |
| 316 SS | Opaque | 18.4 |
| RCP used | Clear | 1.35 |

The appearance of the solutions and the analysis of the iron content of the solutions after the one hour test strongly indicated that the rapid (12 second) RCP technique effectively slowed down loss of anodic material at this low current density (5.4 amp/sq. ft).

Examples 7-10 showed that rapid current reversal at an interval of approximately 6-18 seconds with a low current density, below 10 or 20 amp/sq. ft effectively halted or at least substantially slowed the breakdown of stainless steel or iron anodes when immersed in neutral or slightly acidic water. Although the foregoing bench tests provided data which indicated that rapid current reversal at low densities would result in protection of the anodes of the electrolytic flotation apparatus, however, long term tests under actual operating conditions were deemed necessary in order to determine whether this technique is practical under actual operating conditions. Many factors, such as the presence of minerals, particular wastes, oils, dyes, sludge, scale and scum build-up may affect the electrolytic flotation apparatus in ways which cannot be tested in the laboratory tests described in Examples 7-10 above. Accordingly, Examples 11 and 12 compared the electrolytic flotation apparatus of the present invention under actual operating conditions with and without the rapid RCP technique being utilized.

EXAMPLE 11

An experimental commercial electrolytic flotation device in accordance with the present invention having a 10 electrode cell, each electrode measuring 4 inches by 4 inches. The electrode plates were made from 316 stainless steel and had a thickness of 0.0789 inches with a density of approximately 3.158 pounds per square foot.

The operating current density was 1.0 amps/sq. ft (10.76 amps/sq. meter) and the plate gaps were 0.3194 inches with a total cell area of 1 foot. The unit had a flow velocity of 3.15 inches/min and a detention time of 1.9 minutes. The efficiency of the unit was measured as 0.0021 kg gas produced-per kg impurities removed. Using an energy cost of 8 cents per kilowatt-hour, the operating cost of the unit was measured to be 1.13 cents-per 1000 liters of water treated.

The electrolytic flotation tank was made from 304 stainless steel and included a hinged separator top. The unit included a constant DC power controller which had an operator-set level over 0% to volt range regardless of changes in water conductivity. The sump included a sediment pump, adjustable from 0 to 100% with a 1.3 gallons/hour maximum flow. The unit also included a waste water feed pump with a manually adjustable flow range from 0-100%, including an enclosed fan cooled motor. An in line strainer was used to remove wire, string or other artifacts from the waste water feed. Polymer feed inlets and outlets were also included.

The unit was installed at the IVEX Corporation, Kenilworth, N.J. and was used for processing printing press condensate water containing oily residue and elements of the printing process including ink, paper fibers, starch and possibly some metallic residue. The unit operated from July 14, 1986 to Oct. 28, 1986 for 10 hours per day, five days per week, while reversing the current every 24 hours to distribute the anodic breakdown evenly on all plates. The initial weight of the ten plate cell was 3.443 pounds. After 602 hours of use, this cell weighed 1.704 pounds. The weight loss of the cell was calculated to be 25.09 lbs/amp-yr and the cell exhibited a substantial amount of visible wear and scaling.

EXAMPLE 12

A replacement cell having twelve (12) 316 stainless steel electrodes weighing approximately 4.119 pounds was placed in the same commercial waste water treatment unit described in Example 11. The unit was modified by the addition of a timing unit and current reversal four pole switching relay, Model No. 46MT40F manufactured by the Furans Electric Company, Batavia, Ill. The timer was adjusted to reverse the direction of the current every 6 seconds in accordance with the rapid RCP technique of the present invention. The power supply, timer and current reversal switching relay supplied a current of 1 ampere to the electrodes, although this cell operated at a current density of 0.8 amps/sq. ft (8.61 amps/sq. meter) due to the presence of two additional electrodes. Because the electrodes were closer together, the power requirement was lower than in Example 11. The power requirement was approximately proportional to the drop in current density, accordingly the energy cost for this unit was calculated to be approximately 0.91 cents-per 1000 liters of waste water treated.

This unit operated from Nov. 6, 1986 to Nov. 10, 1987 for approximately 2080 hours. After completion of use, the cell was removed, it weighed 4.038 pounds, and in contrast the electrolytic cell of Example 11, showed no visible signs of wear, corrosion or scaling.

Figure 7:
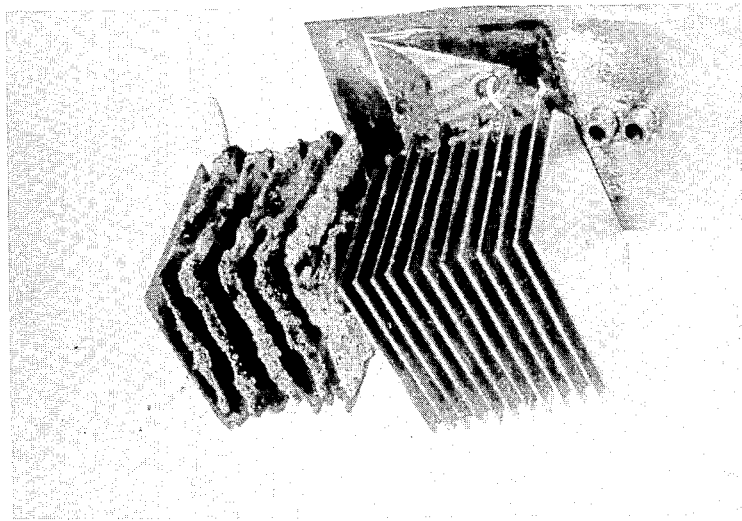

FIG. 7 is a photograph which shows the dramatic differences between the electrolytic cell of Example 11, on the left which did not employ the rapid reverse current technique, versus the electrolytic cell of Example 12, on the right which operated under the same conditions with a rapid RCP technique, reversing the direction of the current every 6 seconds.

The operational data obtained from the experimental field units described in Examples 11 and 12 support the preliminary results of the laboratory bench tests using simulated waste water solutions described in Examples 7-10. This data proves that the use of rapid reverse current plating effectively protects non-precious metals such as stainless steel in electrolytic flotation systems that utilize low current densities. In addition to saving the electrodes from breakdown, the rapid RCP technique prevents costly and commercially disastrous maintenance associated with the build-up of scale and sludge on the electrodes. Table 6 compares the efficiency of the electrolytic flotation systems described in Examples 1 through 6 and 11-12, and compares these to the accepted efficiency of prior electrolytic and dissolved/compressed air flotation systems.

Thus, while there have been described what are presently preferred embodiments of the present invention, other and further changes and modifications could be made thereto without departing from the scope of the invention, and it is intended by the inventor herein to claim all such changes and modifications.

TABLE 6

| Type of Flotation System | Current Density (amps/ sq. meter) | Efficiency Kg gas/mg Impurities Floated | Energy Cost (cents-per 1000 liters) | Detention Time (Minutes) |
| --- | --- | --- | --- | --- |
| Range for Typical P. Art Dissolved/ Compressed Air | — | Range of .0045- .014 | Range of 1-4 | 5-60 |
| Range for P. Art Electrolytic | Range of 1,000- 8,000 | Range of .0045- .014 | 13-50 | 5-60 |
| Electrolytic Flotation Systems Described in Examples: | | | | |
| 1 | 23 | 0.017 | 4.5 | 8.3 |
| 2 | 27.5 | 0.003 | 6.7 | 8.33 |
| 3 | 16.5 | 0.003 | 4.5 | 8.33 |
| 4 | 13.7 | 0.003 | 6.6 | 8.33 |
| 5 | 18.3 | 0.079 | 3.7 | 15.0 |
| 6 | 15.6 | .0025 | 3.8 | 8.3 |
| 11 | 10.76 | 0.0021 | 1.13 | 1.9 |
| 12 | 8.61 | 0.0021 | 0.91 | 1.9 |

I claim:

1. A process for removing foreign matter from water in which it is suspended, comprising the steps of:
   A. providing a plurality of electrodes adjacent to each other to form electrolysis-cell sections therebetween, the electrodes being adapted for application of a potential difference thereto when the electrodes are immersed in water to cause electric current to flow between adjacent electrodes through the water between them;
   B. flowing water having foreign matter suspended therein through the electrolysis cell;
   C. impressing a potential difference between adjacent electrodes to cause electric current to flow therebetween with a density of less than 100 amperes per square meter to electrolyze the water forming hydrogen and oxygen bubbles so that the bubbles coat the suspended foreign matter, causing the foreign matter to float to the surface of the water;
   D. separating the foreign matter at the water surface from the water below, thereby reducing the concentration of foreign matter in the water;
   E. protecting the electrodes from the effects of anodic destruction and scale and scum formation by periodically reversing the direction of the electric current flowing between adjacent electrodes for a predetermined period of time, allowing the current flowing between adjacent electrodes to electrolyze the water forming hydrogen and oxygen bubbles to coat the suspended foreign matter, said predetermined period of time is less than the time required for oxide formed on the electrodes to release into the water, so that when the direction of the current is reversed the oxide formed due to anodic breakdown is reduced back to the surface of the electrode while said electrode is a cathode; and,
   F. continuing to repetitively reverse the direction of the current for said predetermined time to repeat the process.
whereby the electrodes are protected from the effects of anodic destruction and scale and scum formation while efficiently removing foreign matter from the water.

2. The process described in claim 1, wherein said water having foreign matter suspended therein is caused to flow through the electrolysis-cell in a substantially non-turbulent manner and the predetermined period of time of current flow prior to reversal is in the range of approximately 6 to 18 seconds.

3. The process described in claim 2, wherein the current density is approximately 10–50 amperes/sq. meter.

4. A process for removing foreign matter from water in which it is suspended, comprising the steps of:
  A. providing a plurality of electrodes adjacent to each other to form electrolysis-cell sections therebetween, the electrodes being adapted for application of a potential difference when the electrodes are immersed in water to cause electric current to flow between adjacent electrodes through the water between them;
  B. flowing water having foreign matter suspended therein through the electrolysis cell;
  C. impressing a potential difference between adjacent electrodes to cause electric current to flow therebetween to electrolyze the water forming hydrogen and oxygen bubbles so that the bubbles coat the suspended foreign matter, causing the foreign matter to float to the surface of the water;
  D. separating the foreign matter at the water surface from the water below, thereby reducing the concentration of foreign matter in the water;
  E. protecting the electrodes from the effects of anodic destruction and scale and scum formation by periodically reversing the direction of the electric current flowing between adjacent electrodes for a predetermined period of time, allowing the current flowing between adjacent electrodes to electrolyze the water forming hydrogen and oxygen bubbles to coat the suspended foreign matter, said predetermined period of time is less than the time required for oxide formed on the electrodes to release into the water, so that when the direction of the current is reversed the oxide formed due to anodic breakdown is reduced back to the surface of the electrode while said electrode is a cathode; and,
  F. continuing to repetitively reverse the direction of the current for said predetermined time to repeat the process,
whereby the electrodes are protected from the effects of anodic destruction and scale and scum formation while efficiently removing foreign matter from the water.

5. The process described in claim 4, wherein said water having foreign matter suspended therein is caused to flow through the electrolysis-cell in a substantially non-turbulent manner, the rate of water flow being less than 10 liters per second per square meter of cell area; and, the predetermined period of time of current flow prior to reversal is in the range of approximately 6 to 18 seconds.

6. The process described in claim 5, wherein the current density is approximately 10–50 amperes/sq. meter.

7. An improved electrolytic flotation system for removal of foreign matter from water, the system including,
  a. a plurality of electrodes for immersion in water, and,
  b. means for driving the electrodes causing an electrical current to flow between adjacent electrodes so that one electrode is an anode and another is a cathode causing bubbles to be generated in the water by electrolysis between adjacent electrodes, the bubbles adhering to and floating the foreign matter towards the surface of the water, wherein the improvement comprises:
    current reversing control means for reversing the direction of current flowing between adjacent electrodes, the current reversal occurring at a rate which allows the current to flow between the adjacent electrodes for a predetermined duration of time sufficient to generate bubbles in the water by electrolysis, the predetermined period of time is also sufficient for causing oxidized electrode material formed on the cathode to be reduced onto the surface of the cathode, the predetermined duration of time is insufficient to allow oxidized components of the anode from releasing into the water; after the predetermined duration of time has elapsed, the current reversing control means reversing the direction of the current between adjacent electrodes and continually repeating the electrolysis cycle for a desired duration of time,
    whereby the electrodes are protected from the effects of anodic destruction and scale and scum formation while efficiently removing foreign matter from the water.

8. The improved electrolytic flotation system recited in claim 7, wherein the electrodes include stainless steel electrodes and the current density flowing between the electrodes is less than 200 amperes per square meter.

9. The improved electrolytic flotation system recited in claim 8, wherein the current density is in the range of approximately 20 amperes per square meter to 50 amperes per square meter.

10. The apparatus recited in claim 9, wherein said predetermined duration of time of current flow prior to reversal is in the range of approximately 6 seconds to approximately 18 seconds.

11. The improved electrolytic flotation system recited in claim 10, further comprising:
  A. a tank for containing the water;
  B. an inlet for the admission of the water at a first end of the tank;
  C. a first outlet for the admission of pre-treated water out of tank;
  D. a means for pumping the water from the inlet to the first outlet;
  E. said electrodes extending vertically in the tank parallel to the flow of the water through said tank to allow the water to flow between the electrodes in a substantially non-turbulent manner; and,
  F. a second outlet means located near the surface of the water for emitting the foreign matter floated by said bubbles out of said tank.

12. The improved electrolytic flotation system recited in claim 11, further comprising, baffle means for distributing the flow of water through said plurality of electrodes in a substantially non-turbulent manner.

13. The improved electrolytic flotation system recited in claim 12, further comprising: tapered float concentration zone having a decreasing cross-sectional area tapering to said second outlet above the surface of the water,
    whereby the tapered float concentration zone ejects the foreign matter from said second outlet with a force generated by flotation pressure of the gas bubbles rising through the tapered float concentration zone, thus ejected foreign matter separates from the water due to the high pressure of the rising gas resulting in an output which contains a low concentrations of water.

14. The improved electrolytic flotation system recited in claim 13, wherein said tank includes a sump region below said electrodes for collection of foreign matter which settles below said electrodes.

15. An electrolytic flotation system for removing foreign matter from water in which foreign matter is suspended comprising:
   A. a means for causing bubbles of gas to be formed within water in a tank containing suspended foreign matter so that the bubbles adhere to the suspended foreign matter causing the foreign matter to float to the surface of the water due to flotation pressure caused by the gas bubbles;
   B. a tapered float concentration zone of decreasing cross sectional area for concentrating the gas bubbles and floated foreign matter above the surface of the water, said tapered float concentration zone terminating in an outlet above the surface of the water, whereby the float is ejected from the outlet by the force generated from the flotation pressure of the concentrated gas bubbles rising through the tapered float concentration zone, separating the foreign matter from the water, resulting in an output which contains a low concentration of water;

said means for causing bubbles of gas to be formed comprises;
      a. a plurality of electrodes for immersion in the water in the tank;
      b. means for driving the electrodes causing an electrical current to flow between adjacent electrodes so that one electrode is an anode and another is a cathode causing bubbles to be generated in the water by electrolysis between adjacent electrodes, the bubbles adhering to and floating the foreign matter towards the surface of the water; and,
      c. current reversing control means for reversing the direction of current flowing between adjacent electrodes, the current reversal occurring at a rate which allows the current to flow between the adjacent electrodes for a predetermined duration of time sufficient to generate bubbles in the water by electrolysis, the predetermined period of time is also sufficient for causing oxidized electrode material formed on the cathode to be reduced onto the surface of the cathode, the predetermined duration of time is insufficient to allow oxidized components of the anode from releasing into the water; after the predetermined duration of time has elapsed, the current reversing control means reversing the direction of the current between adjacent electrodes and continually repeating the electrolysis cycle for a desired duration of time, whereby the electrodes are protected from the effects of anodic destruction and scale and scum formation while efficiently removing foreign matter from the water.

16. The improved electrolytic flotation system recited in claim 15, wherein the electrodes include stainless steel electrodes and the current density flowing between the electrodes is less than 200 amperes per square meter.

17. The improved electrolytic flotation system recited in claim 16, wherein the current density is in the range of approximately 20 amperes per square meter to 50 amperes per square meter.

18. The apparatus recited in claim 17, wherein said predetermined duration of time of current flow prior to reversal is in the range of approximately 6 seconds to approximately 18 seconds.

19. The improved electrolytic flotation system recited in claim 18, further comprising:
   A. a tank for containing the water;
   B. an inlet for the admission of the water at a first end of the tank;
   C. a first outlet for the admission of pre-treated water out of tank;
   D. a means for pumping the water from the inlet to the first outlet;
   E. said electrodes extending vertically in the tank parallel to the flow of the water through said tank to allow the water to flow between the electrodes in a substantially non-turbulent manner; and,
   F. a second outlet means located near the surface of the water for emitting the foreign matter floated by said bubbles out of said tank.

20. The improved electrolytic flotation system recited in claim 19, further comprising, baffle means for distributing the flow of water through said plurality of electrodes in a substantially non-turbulent manner.

21. The improved electrolytic flotation system recited in claim 20, further comprising flow direction baffling means for directing the flow of waste water through said electrodes and preventing the flow of water around, rather than between said electrodes.

22. The improved electrolytic flotation system recited in claim 21, wherein said tank includes a sump region below said electrodes for collection of foreign matter which settles below said electrodes.

* * * * *

UNITED STATES PATENT AND TRADEMARK OFFICE
CERTIFICATE OF CORRECTION

PATENT NO. : 4,908,109
DATED : March 13, 1990
INVENTOR(S) : Francis C. Wright

Page 1 of 3

It is certified that error appears in the above-identified patent and that said Letters Patent is hereby corrected as shown below:

On the title page before item [57] Abstract:

<u>Attorney, Agent, or Firm</u> now reads "Hoffman & Baron",
    should read --Hoffmann & Baron--;

Column 1, line 58 now reads "pressuremonitoring",
    should read --pressure-monitoring--;

Column 3, line 10 now reads "Typically need",
    should read --typically needing--;

Column 4, line 29 now reads "platinumcoated"
    should read --platinum-coated--;

Column 4, line 41 now reads "For Column 3,",
    should read --For example, see Column 3--;

Column 6, line 5 now reads "deceasing",
    should read --decreasing--;

Column 8, line 6 now reads "466,",
    should read --34,--;

UNITED STATES PATENT AND TRADEMARK OFFICE
CERTIFICATE OF CORRECTION

PATENT NO. : 4,908,109
DATED : March 13, 1990
INVENTOR(S) : Francis C. Wright

It is certified that error appears in the above-identified patent and that said Letters Patent is hereby corrected as shown below:

Column 10, line 3 now reads "has an cross-sectional area",
        should read --has an ever decreasing horizontal
        cross-sectional area--;

Column 12, line 36 now reads "once",
        should read --Once--;

Column 15, line 23 now reads "flotationzone",
        should read --flotation-zone--;

Column 16, line 44 now reads "are",
        should read --as--;

Column 19, line 39 now reads "solutions described",
        should read --solutions, described--;

Column 20, line 59 now reads "process.--,
        should read --process,--;

UNITED STATES PATENT AND TRADEMARK OFFICE
CERTIFICATE OF CORRECTION

PATENT NO. : 4,908,109

DATED : March 13, 1990

INVENTOR(S) : Francis C. Wright

It is certified that error appears in the above-identified patent and that said Letters Patent is hereby corrected as shown below:

Column 23, line 23 now reads "comprises;", should read --comprises:--.

Signed and Sealed this

Fifth Day of May, 1992

Attest:

DOUGLAS B. COMER

Attesting Officer

Acting Commissioner of Patents and Trademarks